(12) United States Patent
Eshun et al.

(10) Patent No.: US 7,356,136 B2
(45) Date of Patent: Apr. 8, 2008

(54) SYSTEM FOR DISCOVER OF PROVISIONING INFORMATION BY TELEPHONES IN A FRAME SWITCHED NETWORK WITHOUT A BROADCAST BASED PROTOCOL

(75) Inventors: Kobi Eshun, San Francisco, CA (US); Partha Saha, Oakland, CA (US)

(73) Assignee: Innomedia Pte Ltd, Singapore (SG)

( * ) Notice: Subject to any disclaimer, the term of this patent is extended or adjusted under 35 U.S.C. 154(b) by 989 days.

(21) Appl. No.: 10/637,457

(22) Filed: Aug. 8, 2003

(65) Prior Publication Data

US 2005/0031108 A1 Feb. 10, 2005

(51) Int. Cl.
*H04M 3/42* (2006.01)

(52) U.S. Cl. .............................. 379/202.12; 379/15.03; 709/221

(58) Field of Classification Search ............. 379/15.03, 379/202.12; 709/221
See application file for complete search history.

(56) References Cited

U.S. PATENT DOCUMENTS 6,636,259 B1 * 10/2003 Anderson et al. ........ 348/211.3
2004/0218045 A1 * 11/2004 Bodnar et al. ........... 348/207.1

* cited by examiner

*Primary Examiner*—Quynh H. Nguyen
(74) *Attorney, Agent, or Firm*—Timothy P. O'Hagan (57) ABSTRACT

When a customer premises internet telephony device (CPE) is manufactured, the factory stores a unique CPE ID number and a contact for a pre-provisioning server in non volatile memory of the CPE. At the time a CPE is purchased by a customer, an internet telephony service provider is selected and a provisioning entity is assigned to the CPE. The unique CPE ID number and a provisioning contact are stored on the pre-provisioning server. At some future time, when the CPE is coupled to the internet, the CPE contacts the pre-provisioning server using the contact for the pre-provisioning server stored in its non volatile memory to obtain the provisioning contact for its assigned provisioning entity.

18 Claims, 7 Drawing Sheets

SYSTEM FOR DISCOVER OF PROVISIONING INFORMATION BY TELEPHONES IN A FRAME SWITCHED NETWORK WITHOUT A BROADCAST BASED PROTOCOL

TECHNICAL FIELD

The present invention relates to distribution of operating information over a frame switched network and more specifically, to a system for discovery of provisioning information over a frame switched network without reliance on a broadcast based protocol.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

In a separate field of technology, the internet Protocols have facilitated widespread deployment of IP compliant packet switched networks for transferring of data between devices. When a device is coupled to an IP compliant network, it is assigned an IP address. Typically, the IP address, along with other required IP networking information, is provided to the device by a DHCP server.

Once the device obtains an IP address and the required IP networking information, the IP address is used to route IP packets between the device and other devices coupled to the internet.

Because of the limited number of IP addresses available, certain blocks of IP addresses, referred to as private network addresses, are routable only on the IP subnet on which the device is coupled. A network address translation server (NAT) is used to couple the subnet to the internet in a manner that enables all of the devices on the subnet to share the globally routable IP address(es) assigned to the NAT server. In this situation, the DCHP server provides an IP address to a device must be located on the same subnet as the device.

More recently, voice telephone service has been implemented over the internet. Advances in the speed of internet data transmissions and internet bandwidth have made it possible for telephone conversations to be communicated using the internet's packet switched architecture and the TCP/IP and UDP/IP protocols.

To promote the wide spread use of internet telephony, the International Telecommunication Union (ITU) had developed the H.323 set of standards and the internet Engineering Task Force (IETF) has developed the Session Initiation Protocol (SIP) and the Multi-Media Gateway Control Protocol (MGCP).

The above described protocols may be used to initiate an internet telephony session between two IP devices utilizing each devices IP address. Several problems exist with integrating internet telephony with traditional circuit switched telephony.

First, people are accustomed to initiating a telephone call using a telephone number that is permanently assigned to the called station. A call placed to an internet telephony device must be initiated using the devices IP address. An IP address of a device is subject to frequent change and, if the device is located on a local area network, the device's IP address may be a private network IP address that is not even routable on the internet. There must exist a solution for enabling a call to be placed to an internet telephony device without entry of the devices IP address at the calling station.

Secondly, a call placed from an internet telephony device may be placed to a called station served by the PSTN. There must exist a solution for enabling a call placed by an internet telephony device to be coupled to the PSTN.

Thirdly, a call placed from a PSTN station may be placed to an internet telephony device. There must exist a solution for enabling a call placed by a PSTN station to be coupled to the internet and routed to the internet telephony device.

To solve these solutions, an internet telephony service provider may assign a PSTN routable number to each internet telephony device. The telephone number routes on the PSTN to a gateway controlled by the telephony service provider. Various servers (e.g. soft switches, call agents, proxy servers, trunking gateways, signaling gateways, accounting servers, etc) facilitate set up, maintenance, and usage tracking for both inbound and outbound calls of the internet telephony device over the internet.

When an internet telephony device is coupled to an IP network, not only does the internet telephony device need to obtain an IP address and the required networking configuration provided by a DHCP server, but the device also needs to obtain internet telephony service provider contact information so that the device may establish services with the internet telephony services provider's provisioning servers such as an SNMP server, a TFTP server, and a SYSLOG server. These servers in turn provide class and device configuration which enable the device to place and receive internet telephony calls through the internet telephony service provider's signaling and gateway servers.

Existing provisioning systems, such as the provisioning system proposed by Cable Television Laboratories in its specification entitled "PacketCable MTA Device Provisioning Specification" numbered PKT-SP-PROV-I06-030415, propose using DHCP options such that a DHCP server can provide the internet telephony service provider contact information. For example, DHCP options enable a DHCP server to provide a fully qualified domain name for the internet telephony service provider's SNMP server and an IP address for the internet telephony service provider's SYSLOG server.

There exist several problems with DHCP provisioning. First, the telephony service provider may not control the DHCP server from which the internet telephony device obtains its configuration.

In this case, the communication service provider has no control over whether the DHCP server provides the options or, if the options are provided, whether the domain names and IP addresses provided are correct. This can lead to one of several results including in-operation of the internet telephony device or unintended operation of the internet telephony device with another communication service provider's system.

What is needed is a system for identifying and contacting an internet telephony service provider's provisioning servers over a packet switched network that does not suffer the disadvantages of the above described systems.

SUMMARY OF THE INVENTION

A first aspect of the present invention is to provide a method of operating a pre-provisioning server that identifies an internet telephony provisioning entity to an internet telephony device. The method comprises storing a pre-provisioning contact and a unique device ID number in a non-volatile memory of the internet telephony device. At the pre-provisioning server the method comprises: i) receiving a provisioning contact of a provisioning entity assigned to the device; ii) storing the provisioning contact in association with a unique device ID number assigned to the device; iii) receiving an inquiry initiated from the device to the pre-provisioning server at the pre-provisioning contact; and iv) responding to the inquiry with a response that includes the provisioning contact.

The step of receiving an inquiry and the step of responding to the inquiry may be performed over a hyper text transport protocol link initiated by the device to the pre-provisioning server.

The step of storing the provisioning contact in conjunction with the unique device ID number may comprise: i) writing the unique device ID number to a key field of a record in a look-up table; and ii) writing the provisioning contact to a binary object field of the record in the look-up table.

Exemplary provisioning contacts include a provisioning contact selected from a group of provisioning contacts consisting of: i) a domain name of a provisioning entry point server; and ii) a combination of an IP address and port number of a provisioning entry point server.

The provisioning entry point server is a server that provides the device with provisioning information selected from a group of provisioning information consisting of: i) telephony configuration parameters associated with the device ID number; and ii) identification of provisioning servers associated with the device ID number which in turn provide telephony configuration parameters.

The step of receiving (at the pre-provisioning server) a provisioning contact of a provisioning entity may comprise receiving: i) the unique device ID number of the device; and ii) the provisioning contact of the provisioning entity encapsulated in an IP frame from the provisioning entity. Alternatively, the step of receiving (at the pre-provisioning server) a provisioning contact of a provisioning entity may comprise receiving: i) the unique device ID number of the device; and ii) the provisioning contact of the provisioning entity encapsulated in an IP frame from a point of sale system that assigned the provisioning entity to the device.

A second aspect of the present invention is to provide a pre-provisioning server for identifying an internet telephony provisioning entity to an internet telephony device. The internet telephony device has both a unique device ID number and a pre-provisioning contact stored in its non-volatile memory.

The pre-provisioning server comprises a management application for receiving a provisioning contact of a provisioning entity assigned to the device and storing the provisioning contact in association with a unique device ID number assigned to the device. The pre-provisioning server also comprises a device application for: i) receiving an inquiry initiated from the device to the pre-provisioning server at the pre-provisioning contact; and ii) responding to the inquiry with a response that includes the provisioning contact that was stored in association with the unique device ID number of the device.

The pre-provisioning server may further comprise a web server application for receiving the inquiry and responding to the inquiry over a hyper text transport protocol link initiated by the device to the pre-provisioning server.

The pre-provisioning server may include a look-up table comprising a key field and a binary object field. The management application stores the provisioning contact in conjunction with the unique device ID number by: i) writing the unique device ID number to the key field of a record in the look-up table; and ii) writing the provisioning contact to the binary object field of the record in the look-up table.

A third aspect of the present invention is to provide an internet telephony device capable of discovering and obtaining telephony provisioning parameters without reliance on a broad cast based protocol.

The internet telephony device comprises a non-volatile memory for storing a unique device ID number assigned to the device and a pre-provisioning contact. The device further comprises an IP module for communicating with other IP devices over a frame switched network using a network configuration. The IP module includes a network configuration module for obtaining the network configuration from a DHCP server.

The device further comprises an internet telephony provisioning module for: i) sending an inquiry to the pre-provisioning server at the pre-provisioning contact stored in the non-volatile memory; ii) receiving a response to the inquiry that includes a provisioning contact; iii) sending a provisioning inquiry to a provisioning entity associated with the provisioning contact; and iv) obtaining provisioning information in response to the provisioning inquiry. Again, exemplary provisioning information includes provisioning information selected from a group of provisioning information consisting of a telephony configuration parameters associated with the device ID number and identification of provisioning servers associated with the device ID number which in turn provides telephony configuration parameters.

The internet telephony provisioning module may: i) send the inquiry to the pre-provisioning server at the pre-provisioning contact by initiating a hyper text transport protocol link to the pre-provisioning server; and ii) receives the response to the inquiry on the hyper text transport protocol link.

The internet telephony device may further determine: i) whether telephony provisioning resources are included in a DHCP response provided by the DHCP server; and ii) send a provisioning inquiry to a provisioning entity associated with the provisioning contact in response to determining that the DHCP response does not include telephony provisioning resources.

The internet telephony provisioning module may stores the provisioning contact in the non volatile memory in response to receiving the response that includes a provisioning contact. And, the internet telephony provisioning module may send the inquiry to the pre-provisioning server at the pre-provisioning contact in response to determining that the provisioning contact is not available in the non volatile memory.

For a better understanding of the present invention, together with other and further aspects thereof, reference is made to the following description, taken in conjunction with the accompanying drawings, and its scope will be pointed out in the appended clams.

DETAILED DESCRIPTION OF THE EXEMPLARY EMBODIMENTS

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Figure 1:
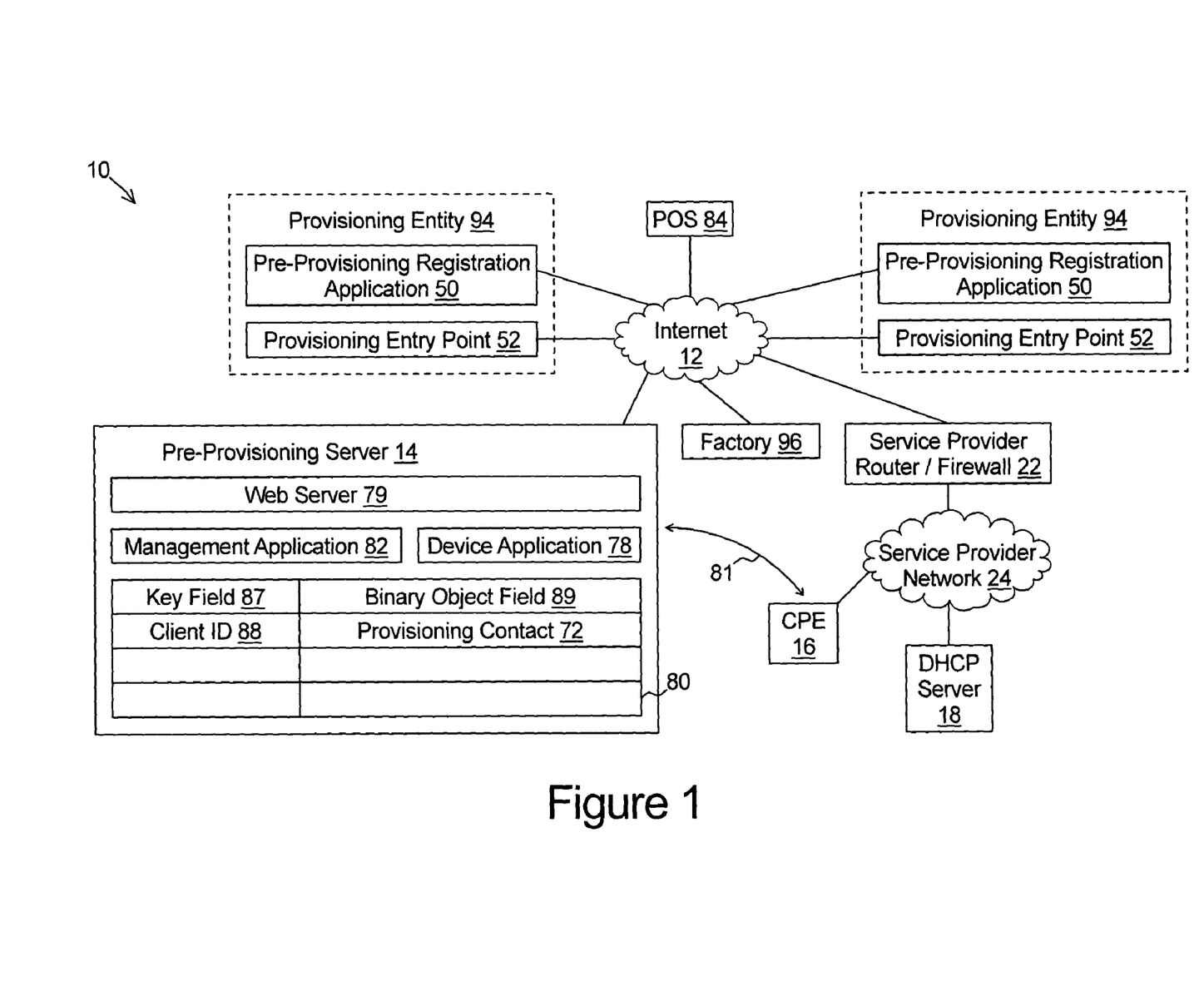
FIG. 1 is a block diagram representing a system for discovery of provisioning information by an internet telephony device without reliance on a broad cast based protocol.

FIG. 1 represents a block diagram useful for discussing the system for discovery and provisioning of an internet telephony device without reliance on a broad cast based protocol. The block diagram of FIG. 1 comprises various devices coupled to a frame switched internet 12 which may be the internet and is referred to herein as the internet 12.

Coupled to the internet 12 are a pre-provisioning server 14, a plurality of provisioning entities 94, a factory system 96, a point of sale (POS) system 84, and an internet service provider (ISP) router or firewall 22.

Coupled to the ISP router or firewall 22 is a service provider network 24 which also operates the internet protocols. Coupled to the service provider network 24 are a customer premises telephony device (CPE) 16 and a DHCP server 18.

It should be appreciated that while the pre-provisioning server 14, each provisioning entity 94, the factory system 96, and the POS system 84 are shown coupled directly to the internet 12, it is possible for any of such devices to be located on one or more ISP networks so long as appropriate routers and firewalls enable the access required of this invention.

Each of the above described devices operates a suite of IP protocols that enable the device to set up TCP/IP logical connections and/or UDP/IP channels with other devices over the service provider network 24 and the internet 12. The pre-provisioning server 14 has a globally routable public internet Protocol (IP) address such that the other devices may initiate TCP/IP logical connections and/or UDP/IP channels to the pre-provisioning server 14 over the service provider network 24 and the internet 12.

Each provisioning entity 94 may have a globally unique IP address or a private network IP address so long as the provisioning contact 72 (discussed below) uniquely routes to the provisioning entity 94 (or more specifically, to a provisioning entry point 52 of the provisioning entity 93).

Each of the factory system 96 and the POS system 84 may have a globally routable public IP address or a non-globally routable private network IP address so long as such systems 96 and 84 have the capability of establishing TCP/IP connections to each of the provisioning server 20 and the pre-provisioning server 14.

The CPE 16 may have a globally routable public IP address (if the service provider network 24 is coupled to the internet 12 via a router 22) or a non-globally routable private network IP address (if the service provider network 24 is coupled to the internet 12 by a network address translation firewall 22) so long as it has the capability of i) contacting and communicating with the DHCP server 18 using DHCP protocols, and ii) establishing TCP/IP logical connections and/or UDP/IP channels to each of the pre-provisioning server 14 and its provisioning entity 94.

Figure 2:
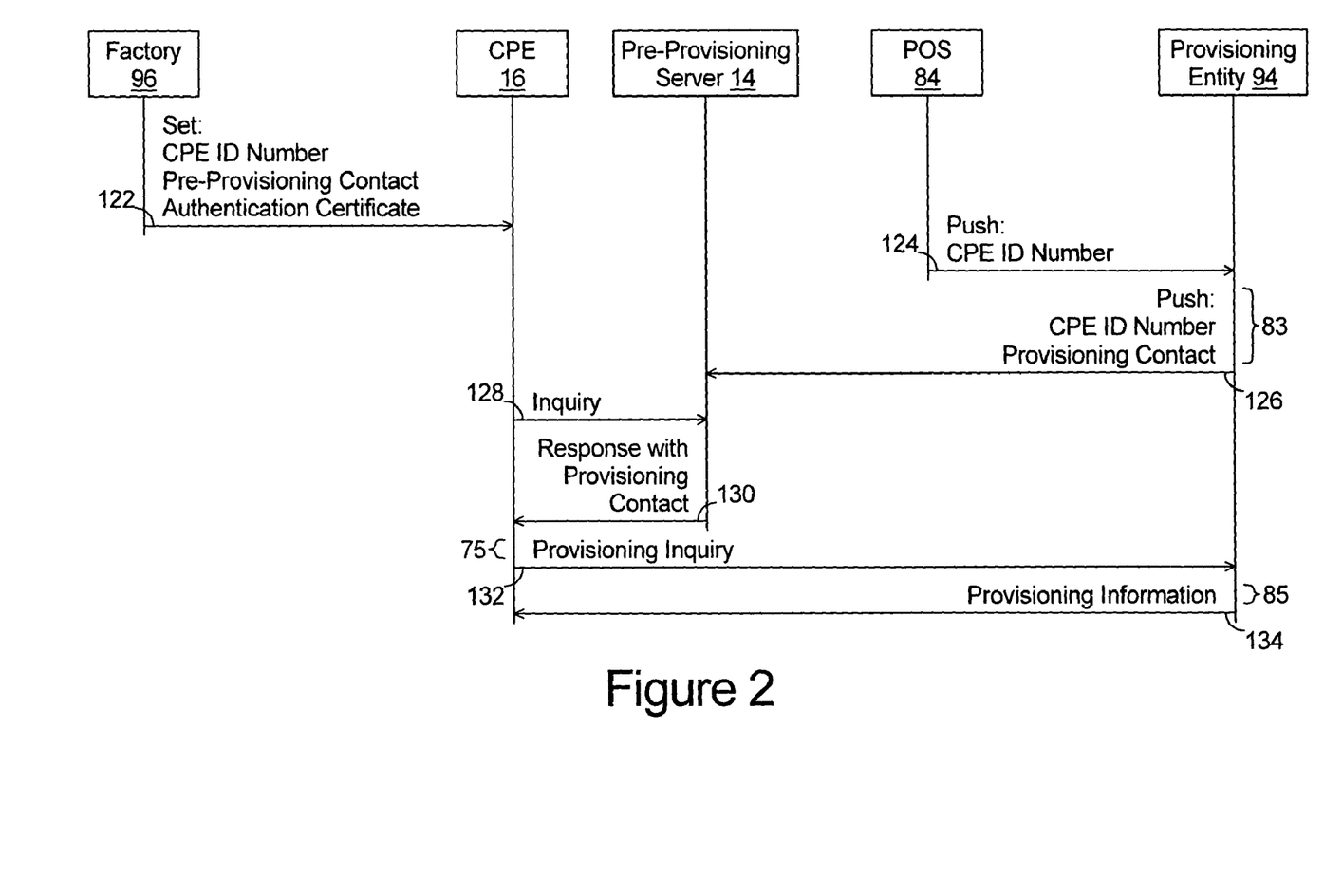
FIG. 2 is a ladder diagramming representing a first embodiment of operation of the system of FIG. 1.

FIG. 2 is a ladder diagram that facilitates an overview discussion of a first embodiment of the system for the CPE 16 to discover its telephony service provider provisioning resource without relying on a broadcast protocol.

Referring to FIG. 2 in conjunction with FIG. 1, when a CPE 16 is manufactured, the factory system 96 assigns a unique CPE ID number 88 to the CPE 16. The unique ID number may be a variation of the globally unique MAC address of the CPE 16.

The factory system 96 stores within non-volatile memory 28 (FIG. 5) of the CPE 16: i) the CPE ID number 88, an authentication certificate 32 (such as an X.509 compliant certificate), and a pre-provisioning contact 34 which may be: i) an IP address and port number on which the pre-provisioning server 14 receives inquiries from a CPE 16 (discussed herein); ii) a fully qualified domain name of the pre-provisioning server 14, or iii) other information useful for contacting the pre-provisioning server 14 over the service provider network 24 and the internet 12. The step of storing such information in the CPE 16 is represented by step 122 of the ladder diagram of FIG. 2.

At the time a CPE 16 is purchased by a customer, the customer will also be selecting a service contract with an internet telephony service provider which will control which provisioning entity 94 from which the CPE 16 is to obtain its internet telephony service provisioning. Step 124 represents the POS system 84 assigning the provisioning entity 94 to the CPE 16 and providing the provisioning entity 94 with the CPE ID number 88 of the CPE 16. It should be appreciated that each provisioning entity 94 may be controlled by a different internet telephony service provider and may provisioning telephony confirmation parameters to its CPE client 16 utilizing different provisioning schemes.

The assigned provisioning entity 94 then passes the CPE ID number 88 and a provisioning contact 72 to the pre-provisioning server 14 encapsulated in an IP frame 83 as represented by step 126. In the exemplary embodiment, the provisioning contact 72 may be: i) an IP address and port number on which the provisioning entity 94 receives inquiries from a CPE 16 (discussed herein); ii) a fully qualified domain name of the provisioning entity 94, or iii) other information useful for contacting the provisioning entity 94 over the service provider network 24 and the internet 12. The pre-provisioning server 14 then stores the provisioning contact 72 in association with the CPE ID number 88 in its look-up database 80.

At some future time, when the CPE 16 is initially coupled to the service provider network 24 or to the internet 12, the CPE 16 will have only its CPE ID number 88, its authentication certificate 32, and the pre-provisioning contact 34 (which may be an IP address and port number of the pre-provisioning server 14 or a fully qualified domain name of the pre-provisioning server 14) stored in its non volatile memory. As such, the CPE 16 will not have a provisioning contact 72 available.

To obtain a provisioning contact 72, the CPE 16 establishes a hyper text transport protocol link 81 to the pre-provisioning server 14 using the pre-provisioning contact 34 stored in its non volatile memory 28 and sends an inquiry as represented by step 128. The inquiry includes the CPE ID number 88.

In response, the pre-provisioning server 14 returns the provisioning contact 72 associated with the CPE ID number 88 (as stored during step 126 above) to the CPE 16 at step 130 on the hyper text transport protocol link 81.

Upon receipt of the provisioning contact 72, the CPE 16 will store the provisioning contact 72 in its non-volatile memory 28. By storing the provisioning contact 72 in non-volatile memory 28, the CPE 16 will have the provisioning contact 72 available at each future power up and will not have to again contact the pre-provisioning server 14 unless the CPE 16 experiences a factory reset.

After the CPE 16 has stored the provisioning contact 72, the CPE 16 uses the provisioning contact 72 to make a provisioning inquiry 75 to the provisioning entity 94 at step 132 and to obtain its internet telephony service provider provisioning information 85 at step 134.

Pre-Provisioning Server

The pre-provisioning server 14 comprises a look-up database 80, a management application 82, a device application 78, and a web server application 79. The look-up database 80 may be a table with two columns and a plurality of records. A key field 87 will store the CPE ID number 88 and a binary object field 89 will store a binary large object (BLOB) that represents a provisioning contact 72 associated with the CPE ID number 88.

The management application 82 interfaces with the provisioning entities 94 for building records of the look-up database 80 by performing the functions of the pre-provisioning server 14 discussed above with respect to step 126 of the ladder diagram of FIG. 2.

Figure 3A:
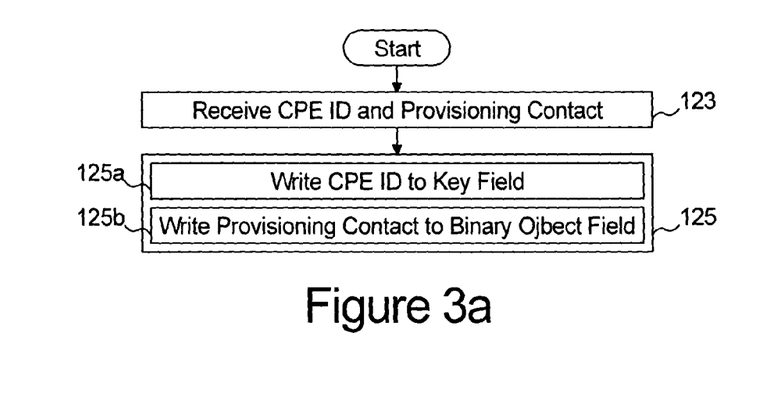
FIG. 3a is a flow chart representing operation of a pre-provisioning server in accordance with one embodiment of the present invention.

The flow chart of FIG. 3a represents operation of the management application 82 in interfacing with the provisioning entities 94. Referring to FIG. 3a in conjunction with FIG. 1, step 122 represents receiving a CPE ID number 88 and the provisioning contact 72 from the provisioning entity 94.

Step 124 represents the management application 82 creating a new record in the look-up database 80. The new record associates the CPE ID number 88 with the provisioning contact 72 as received from the provisioning entity 94. More specifically, step 124a represents writing the CPE ID number 88 to the key field 87 of the look-up database 80 and step 124b represents writing the provisioning contact 72 to the binary object field 89 of the look-up database 80.

It should be appreciated that a provisioning entity 94 associated with a first internet telephony service provider may provide a single IP address and port number of a provisioning server as a provisioning contact 72 while a provisioning entity 94 associated with a second internet telephony service provider may provide a fully qualified domain name, a kerberized realm, multiple domain names or IP addresses of multiple servers, or other information for contacting its provisioning realm as a provisioning contact 72. As such, by storing the provisioning contact 72 in the look-up database 80 as a binary object, the various formats for a provisioning contact 72 that may be used by various internet telephony service providers can be accommodated.

Figure 3B:
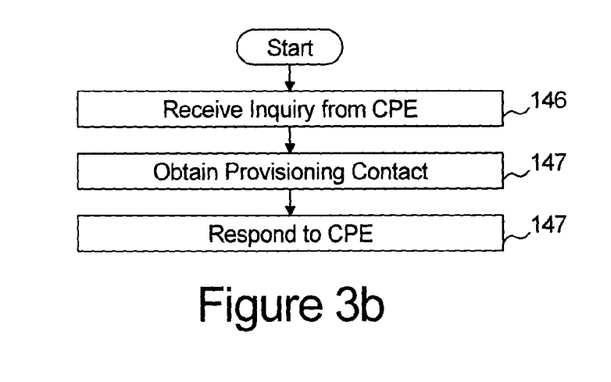
FIG. 3b is a flow chart representing operation of a pre-provisioning server in accordance with one embodiment of the present invention.

The device application 78 interfaces with the CPE 16 for reading records of the look-up database 80 and performing the functions of the pre-provisioning server 14 discussed above with respect to steps 128 and 130 of the ladder diagram of FIG. 2. The flow chart of FIG. 3b represents operation of device application 78 in interfacing with the CPE 16.

Figure 6:
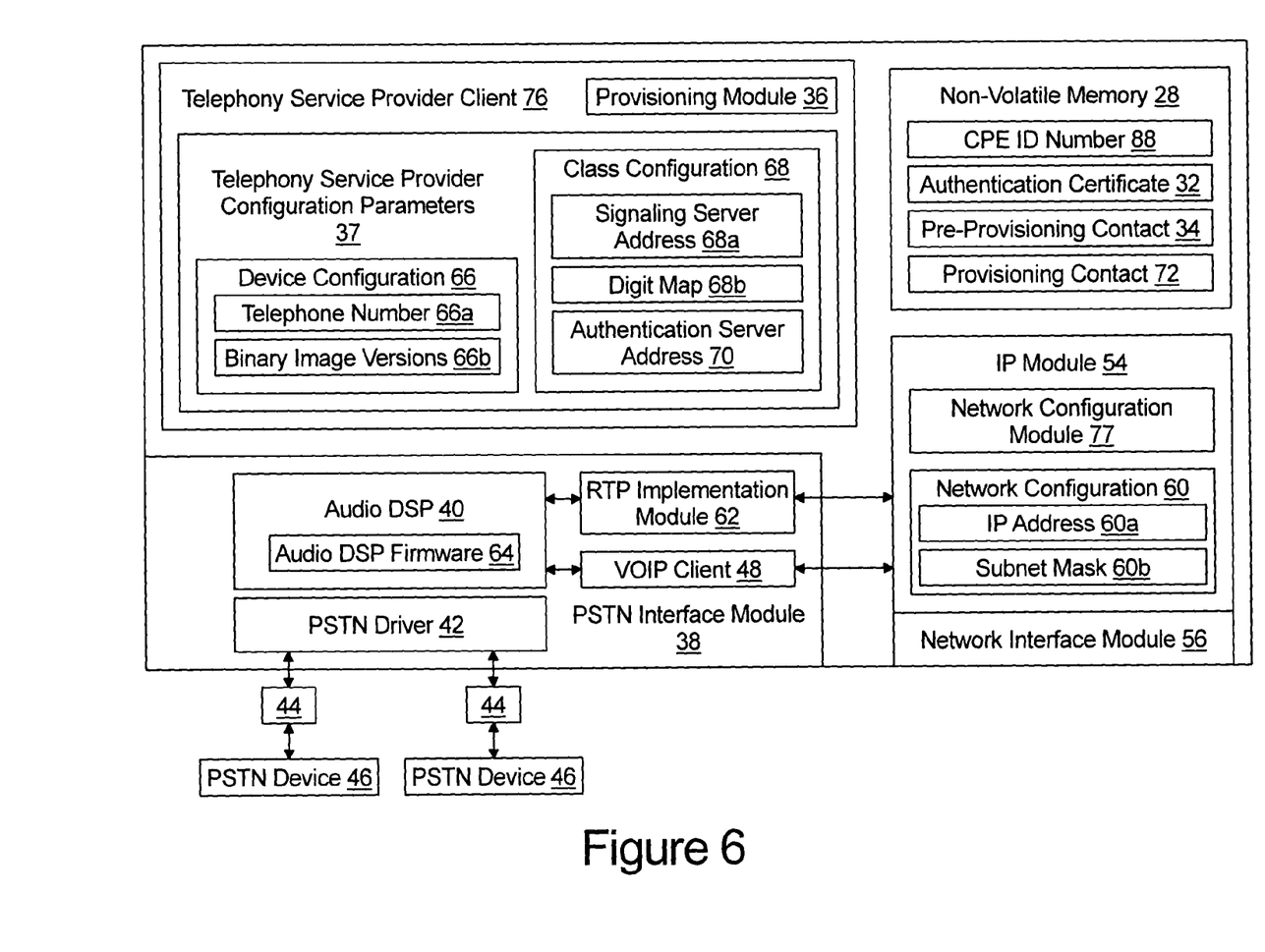
FIG. 6 is block diagram representing customer premises internet telephony equipment in accordance with one embodiment of the present invention.

Step 146 represents receiving an HTTP or HTTPS inquiry 150 from the CPE 16 over a TCP/IP connection established by the CPE 16 to the web server application 179 of the pre-provisioning server 14. Referring briefly to FIG. 6, the inquiry 150 is graphically represented. The inquiry 150 comprises applicable TCP/IP and lower level headers 154 along with payload 155 that includes the CPE ID number 88.

Returning to FIG. 3b, step 147 represents obtaining, from the look-up database 80, the provisioning contact 72 that associates with the CPE ID number 88 provided in the inquiry 150.

Figure 4:
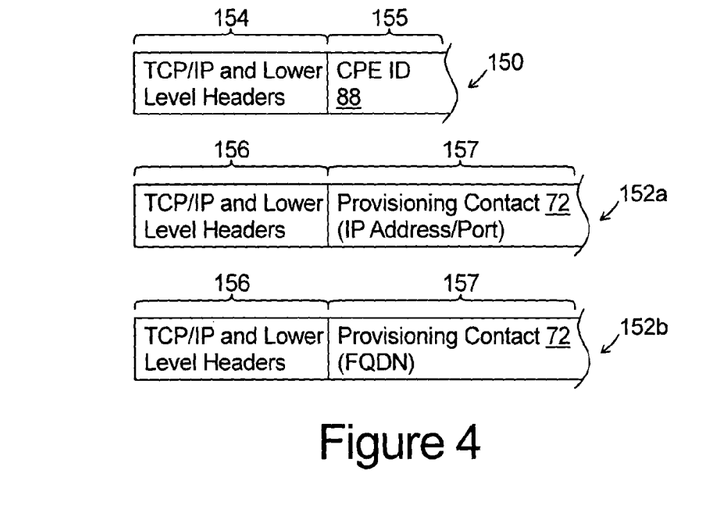
FIG. 4 is a graphic representation of each of a query message and a response message in accordance with one embodiment of the present invention.

Step 148 represents returning a response message 152 to the CPE 16. Referring briefly to FIG. 4, the response message 152a is graphically represented. The response message 152a comprises applicable TCP/IP and lower level headers 156 along with payload 157 that comprises the provisioning contact 72 in the format of an IP address and port number of the provisioning entry point 52 of the provisioning entity 94. The response message 152b comprises applicable TCP/IP and lower level headers 156 along with payload 157 that comprises the provisioning contact 72 in the format of a fully qualified domain name of the provisioning entry point 52 of the provisioning entity 94.

Provisioning Entity

Returning to FIG. 1, a provisioning entity 94 may comprises a provisioning entry point 52 and a pre-provisioning registration application 50.

The provisioning entry point server 52 provides telephony service provider provisioning information to a CPE 16 which contacts the provisioning entity 94 utilizing the provisioning contact 72 as provided by the pre-provisioning server.

As will be discussed in more detail below with reference to exemplary provisioning entry point servers 52, the provisioning information may be provisioning information selected from a group of provisioning information consisting of: i) telephony configuration parameters associated with the device ID number; and ii) identification of provisioning servers associated with the device ID number which in turn provide telephony configuration parameters.

The pre-provisioning registration application 50 interfaces with the POS system 84 for receiving a CPE ID number 88 associated with a CPE device 16 that has been assigned to the provisioning entity 94 as discussed above with respect to step 124 of the ladder diagram of FIG. 2. The pre-provisioning registration application 50 also interfaces with the pre-provisioning server 14 for pushing a CPE ID number 88 and a provisioning contact 72 to the pre-provisioning server 14 as discussed above with respect to step 126 of the ladder diagram of FIG. 2.

Figure 5:
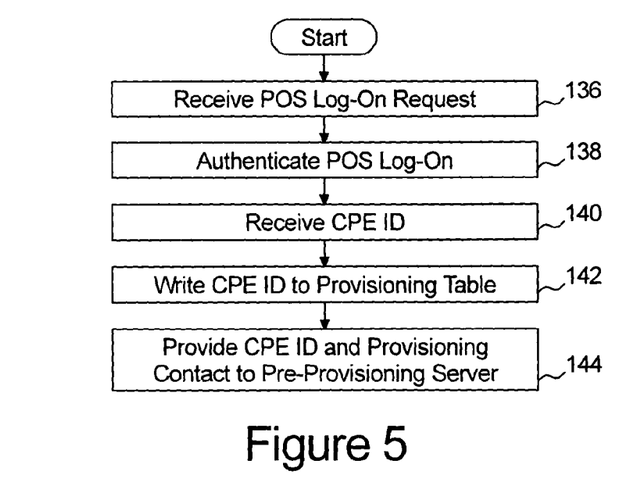
FIG. 5 is a flow chart representing operation of a pre-provisioning registration application of a provisioning entity in accordance with one embodiment of the present invention.

The flow chart of FIG. 5 represents operation of the pre-provisioning registration application 50 in interfacing with the POS system 84 and the pre-registration server 14. Referring to FIG. 5, step 136 represents receiving a log on request from the POS system 84 and step 138 represents authenticating the log on request. The log-on of the POS system 84 may be identified and authenticated using known systems such as a log-on ID and password combination.

Step 140 represents receiving, from the POS system 84, a CPE ID number 88 of a CPE 16 assigned to the provisioning entity 94. Step 142 represents creating a new record in the provisioning table 95 by writing the CPE ID number 88 to the provisioning table 95.

Step 144 represents the pre-provisioning application 50 establishing a connection to the pre-registration server and providing to the pre-registration server 14 the CPE ID number 88 associated with the CPE 16 and the provisioning contact 72 associated with the provisioning entity 94.

Customer Premises Device

FIG. 6 is a block diagram representing an exemplary CPE 16. Referring to FIG. 6 in conjunction with FIG. 1, the CPE 16 operates as a PSTN gateway for the plurality of PSTN devices 46. More specifically, the CPE 16 includes a network interface module 56, an IP module 54, non-volatile memory 28, a PSTN interface module 38, and a telephony service provider client 76.

The network interface module 56 utilizes known physical layer protocols which are compliant with those utilized on the service provider network 24 such that IP frames may be exchanged between the CPE 16 over the service provider network 24 and the internet 12.

The IP module 54 formats higher level data packets into TCP/IP or UDP/IP frames for transmission to remote devices over the service provider network 24 and the internet 12. To provide such formatting, the IP module 54 requires configuration parameters 60 such as an IP address 60a and a subnet mask 60b. A network configuration module 77 communicates over the service provider network 24 with the DHCP server 18 to obtain the network configuration 60 necessary for operation of the IP module 54.

The PSTN interface module 38 emulates a PSTN subscriber loop on each of a plurality of PSTN ports 44 for interfacing with traditional PSTN devices 46 utilizing in-band analog or digital PSTN signaling. The PSTN interface module 38 includes a PSTN driver 42. The PSTN driver 42 emulates a PSTN subscriber loop on each PSTN port 44 for interfacing with a traditional PSTN device 46 utilizing in-band analog or digital PSTN signaling.

The PSTN driver 42 is coupled to an audio DSP 40 and a VoIP client 48. The VoIP client 48 interfaces with the PSTN driver 42 during call set up and exchanges VoIP call signaling with remote VoIP devices such as the soft switch or call agent, and other VoIP endpoints. More specifically, the audio DSP 40: i) detects PSTN events on each PSTN port 44 (through the PSTN driver 42) such as Off Hook, On Hook, Flash Hook, DTMF tones, Fax Tones, TTD tones and generates applicable signaling signals to the VoIP module 48; ii) generates PSTN signaling (through the PSTN driver 42) such as Ring, Dial Tone, Confirmation Tone, and in band caller ID in response to applicable signaling signals from the VoIP module 48; and iii) converts between PSTN audio media and compressed digital audio media. The audio DSP 40 also provides echo cancellation and conference mixing of digital audio signals.

The VoIP client 48 converts between the signaling signals exchanged with the audio DSP 40 and VoIP call signaling messages exchanged with a remote VoIP endpoints.

The real time protocol implementation module 62 operated during a media session to: i) encapsulate compressed digital audio media generated by the audio DSP 40 into real time protocol frames for transmission to the remote endpoint during a media session; and ii) receives and orders real time protocol frames received from the remote endpoint and presents the compressed digital audio media encapsulated therein to the audio DSP 40.

The audio DSP 40 operates algorithms which convert between the digital audio media exchanged with the PSTN driver 42 and compressed digital audio media exchanged with the real time protocol implementation module 62 utilizing a compression algorithm stored as part of the audio DSP firmware 64. Exemplary compression algorithms utilized by audio DSP 40 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G.729E.

The telephony service provider client 76 provides for operation of the CPE 16 within the internet telephony service provider's system. In one aspect, the telephony service provider client 76 comprises a provisioning module 36, which operates as previously discussed with respect to the ladder diagram of FIG. 2, to interface with the pre-provisioning server 14 and the provisioning entity 94 (and optionally other provisioning systems of the internet telephony service provider), to obtain telephony service provider configuration parameters 37. The internet telephony service provider configuration parameters 37 comprise class configuration parameters 66 and device configuration parameters 68 necessary for the CPE 16 to operate with the internet telephony service provider's systems.

Exemplary class configuration parameters 68 may comprise parameters such a signaling server addresses 68a, a digit map 68b, and other management server address 68c. Exemplary device configuration parameters 66 may comprise parameters such as the telephone number 66a assigned to the CPE 16 and binary image versions 66b (including the audio DSP firmware 64) applicable for operation of the CPE 16.

Figure 7:
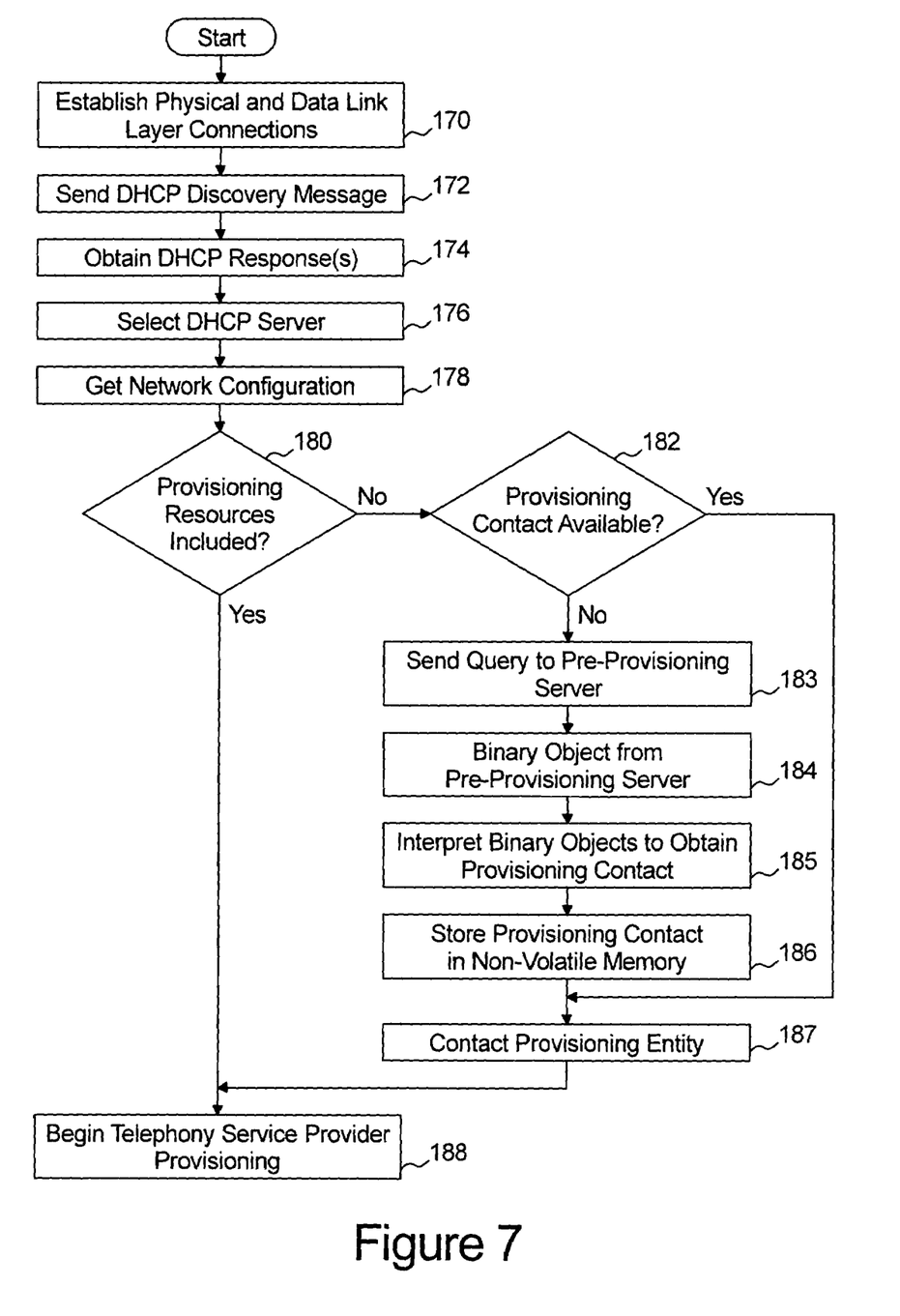
FIG. 7 is a flow chart representing exemplary operation of customer premises internet telephony equipment in discovery of provisioning information by an internet telephony device without reliance on a broad cast based protocol.

The flow chart of FIG. 7 represents exemplary operation of the network interface circuit 56, the network configuration module 77 and the provisioning module 36 to obtain the network configuration 60 and the telephony service provider configuration 37. Referring to the flow chart of FIG. 7 in conjunction with the block diagram of FIG. 6, step 170 represents the network interface module 56 establishing known physical and data link layer connections for communications over the service provider network 24 to which the CPE 16 is coupled.

Steps 172 through 178 represent the network configuration module 77 obtaining the network configuration 60 for operation of the CPE 16 as a network device on the service provider network 24. Steps 180-188 represent the provisioning module 36 obtaining the internet telephony service provider configuration parameters 37 for operation of the CPE 16 as a internet telephony endpoint utilizing the internet telephony service provider's systems.

Step 172 represents the network configuration module 77 sending a known DHCP discovery message on the service provider network 24. The DHCP discovery message may include an indication that the CPE 16 requires provisioning contact 72 such that if there exists a DCHP server that is controlled by the internet telephony service provider and can be reached by the DHCP discovery message, such DHCP server may respond.

Step 174 represent obtaining DHCP response messages from one or more responding DHCP servers. A DHCP server that is not controlled by (or associated with) the internet telephony service provider will include a known response that indicates that the responding server is unable to provide any recourses needed to initiate internet telephony service provider provisioning. Alternatively, a DHCP server that is controlled by the internet telephony service provider may indicate that it is able to provide the provisioning contact 72 or other telephony provisioning resources useful to the provisioning module 36 in obtaining internet telephony service provider provisioning.

Step 176 represents selecting a DHCP server. If a DHCP server response indicates that the responding DHCP server is able to provide the provisioning contact 72, or other telephony provisioning resources, then the network configuration module 77 will select that DHCP server while silently ignoring the other responses.

Alternatively, if no DHCP response indicates the ability to provide the provisioning contact 72 or other telephony provisioning resources, the network configuration module 77 may select a DHCP server based on any other known criteria.

Step 178 represents obtaining the network configuration 60 from the selected DCHP server. As previously discussed, the network configuration 60 may comprise an IP address 60a and a subnet mask 60b.

Step 180 represents determining whether a valid provisioning contact 72 or other valid telephony provisioning resources were received from the DHCP server. If yes, the provisioning module 36 utilizes the provisioning contact 76 or the other telephony provisioning resources to obtain the telephony service provider configuration parameters 37 from the provisioning entity 94 (or other provisioning entity referenced in the other telephony provisioning resourced provided by the DCHP server) at step 188.

Alternatively, if at step 180 it is determined that neither a valid provisioning contact 72 nor other telephony provisioning resources are available from the DHCP server, then step 182 is executed.

Step 182 represents determining whether the provisioning contact 72 is available in the non-volatile storage 28. If yes, the provisioning module 36 uses the provisioning contact 72 to contact the provisioning entity 94 and, at step 188 obtains the telephony configuration parameters 37.

However, if at step 182, the provisioning contact 72 is not available in non-volatile storage 28, then at step 183, the provisioning module 36 opens the hyper text transport protocol channel 81 (FIG. 1) to the pre-provisioning server 14 and sends the query 150 (FIG. 4) as previously discussed.

Step 184 represents receiving the response message 152 (FIG. 4) back from the pre-provisioning server 14 which includes the binary object that contains the provisioning contact 72 as previously discussed.

Step 185 represents interpreting the binary object to extract the provisioning contact 72. As previously discussed, the pre-provisioning server 14 accommodates multiple different provisioning entities storing their provisioning contacts with the look-up database 80. And, each provisioning entity may format its provisioning contact differently than other provisioning entities. (e.g. a fully qualified domain name, a kerberized realm, multiple domain names or IP addresses of multiple servers, or other information for contacting a provisioning realm). To accommodate such multiple formats, the pre-provisioning server simply receives the provisioning contact 72 as a binary object, stores it as a binary object, and provides it to the CPE 16 as a binary object. As such, the provisioning module 36 must interpret the received binary object to determine the provisioning contact 72.

Step 186 represents storing the provisioning contact 72 in the non volatile storage 28 so that it may be used at future power up cycles without repeating steps 183, 184, and 185.

Step 187 represents contacting the provisioning entity 94 using the provisioning contact 72 and, at step 188 obtaining the telephony configuration parameters 37.

Alternative Embodiment

Figure 8:
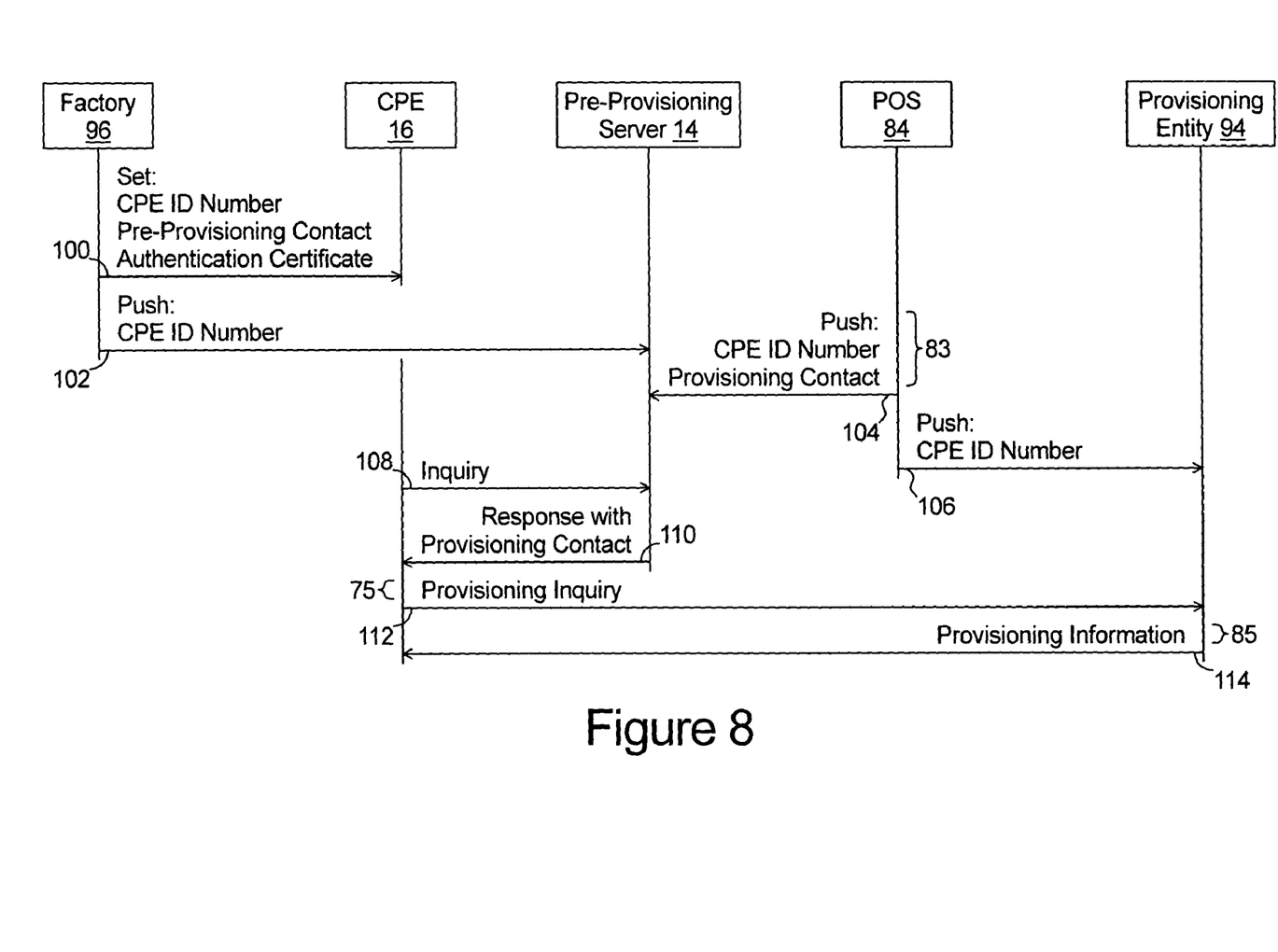
FIG. 8 is a ladder diagramming representing a second embodiment of operation of the system of FIG. 1.

FIG. 8 is a ladder diagram that facilitates an overview discussion of a second embodiment of the system for the CPE 16 to discover its telephony service provider provisioning resource without relying on a broadcast protocol.

Referring to FIG. 8 in conjunction with FIG. 1, when a CPE 16 is manufactured, the factory system 96 assigns a unique CPE ID number 88 to the CPE 16. The unique ID number may be a variation of the globally unique MAC address of the CPE 16.

Similar to the first embodiment, the factory system 96 stores within non-volatile memory 28 (FIG. 5) of the CPE 16: i) the CPE ID number 88, an authentication certificate 32 (such as an X.509 compliant certificate), and a pre-provisioning contact 34 which (as previously discussed) may be: i) an IP address and port number on which the pre-provisioning server 14 receives inquiries from a CPE 16 (discussed herein); ii) a fully qualified domain name of the pre-provisioning server 14, or iii) other information useful for contacting the pre-provisioning server 14 over the service provider network 24 and the internet 12. The step of storing such information in the CPE 16 is represented by step 100 of the ladder diagram of FIG. 8.

The factory system 96 also provides the CPE ID number 88 to the pre-provisioning server 14, as represented by step 102, such that the pre-provisioning server 14 may create a record for the newly manufactured CPE 16 in its look-up database 80.

At the time a CPE 16 is purchased by a customer, the customer will also be selecting a service contract with an internet telephony service provider which will control the provisioning entity 94 from which the CPE 16 is to obtain its internet telephony service provisioning. Step 104 represents the POS system 84 assigning the provisioning entity 94 to the CPE 16 and providing the pre-provisioning server 14 with the CPE ID number 88 of the CPE 16 and a provisioning contact 72 associated with the assigned provisioning entity encapsulated in an IP frame 83. This enables the pre-provisioning server 14 to associate the provisioning contact 72 with the CPE ID number 88 previously stored in the look-up database 80.

The POS system 84 also provides the CPE ID number 88 to the provisioning entity 94 at step 106.

At some future time, when the CPE 16 is initially coupled to the service provider network 24 or to the internet 12, the CPE 16 will have only its CPE ID number 88, its authentication certificate 32, and the IP address 36 of the pre-provisioning server 14 (or fully qualified domain name of the pre-provisioning server 14) stored in its non volatile memory. As such, the CPE 16 will not have a provisioning contact 72 available.

To obtain a provisioning contact 72, the CPE 16 makes and inquiry to the pre-provisioning server 14 using the pre-provisioning contact 34 stored in its non volatile memory 28 at step 108. The inquiry includes the CPE ID number 88.

In response, the pre-provisioning server 14 returns the provisioning contact 72 associated with the CPE ID number 88 (as stored during step 104 above) to the CPE 16 at step 110.

Upon receipt of the provisioning contact 72, the CPE 16 will store the provisioning contact 72 in its non-volatile memory 28. By storing the provisioning contact 72 in non-volatile memory 28, the CPE 16 will have the provisioning contact 72 available at each future power up and will not have to again contact the pre-provisioning server 14 unless the CPE 16 experiences a factory reset.

After the CPE 16 has stored the provisioning contact 72, the CPE 16 uses the provisioning contact 72 to make a provisioning inquiry 75 to the provisioning entity 94 at step 112 and to obtain its internet telephony service provider provisioning information 85 at step 114.

Provisioning Entry Points

As discussed above, the provisioning entity 94 comprises a provisioning entry point 52 which interfaces with the CPE 16 when the CPE 16 contacts the provisioning entity 94 using the provisioning contact 72.

Figure 9:
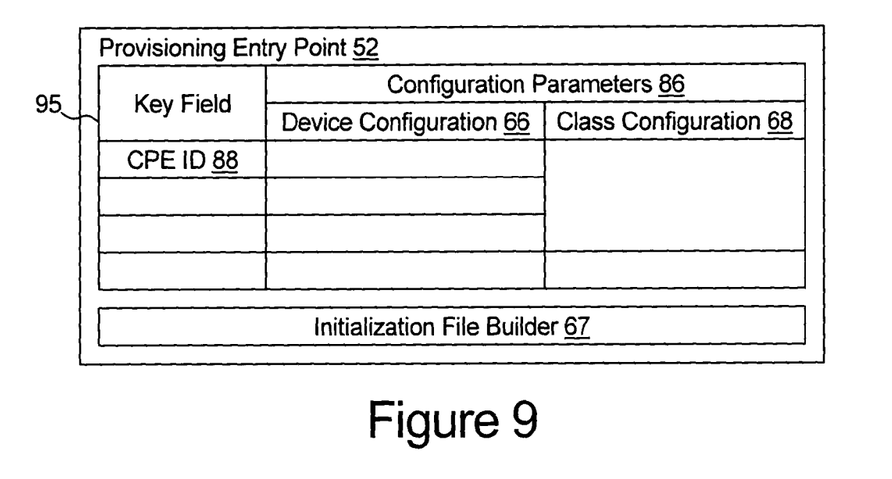
FIG. 9 represents a exemplary embodiment of a provisioning entry point of a provisioning entity in accordance with one embodiment of the present invention.

FIG. 9 represents a first example of a provisioning entry point 52. The entry point 52 of FIG. 9 provides provisioning information to the CPE 16 which comprises internet telephony configuration parameters 86.

The provisioning entry point 52 of FIG. 9 comprises a provisioning database 95 and an initialization file building application 67. The provisioning database 95 comprises a main table with a plurality of records, each of which is keyed to the CPE ID number 88. Associated with the CPE ID number 88 in the provisioning database 95 are configuration parameters 86 applicable to the device 16 bearing the CPE ID number 88. The configuration parameters 86 comprise class configuration parameters 68 and device configuration parameters 66.

When a CPE 16 sends a provisioning inquiry 75 (FIGS. 2 and 8) to the provisioning entry point 52 of FIG. 9, the initialization file builder 67 may obtain device specific capabilities from the CPE 16, combine those device specific abilities with applicable device configuration parameters 66 and class configuration parameters 68 to build an initialization file comprising all of the necessary class configuration and device configuration parameters needed by the CPE 16 for operation in conjunction with the internet telephony service provider's systems. The initialization file is then provided to the CPE 16 as the provisioning response 85 (FIGS. 2 and 8).

Figure 10:
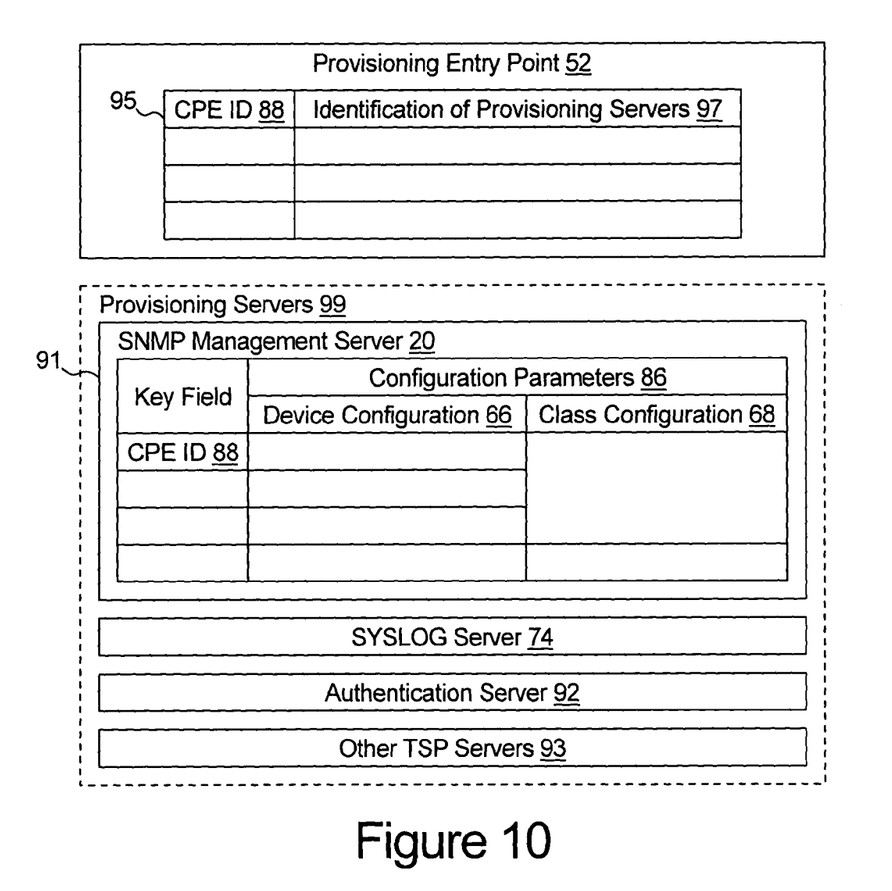
FIG. 10 represents a exemplary embodiment of a provisioning entry point of a provisioning entity in accordance with one embodiment of the present invention.

FIG. 10 represents a second example of a provisioning entry point 52. The provisioning entry point 52b comprises a starting point for a provisioning process that requires the CPE 16 to contact multiple servers to obtain telephony service provisioning.

The provisioning entry point 52 of FIG. 10 comprises a provisioning database 95. The provisioning database 95 comprises a main table with a plurality of records, each of which is keyed to the CPE ID number 88. Associated with the CPE ID number 88 in the provisioning database 95 are identification of provisioning servers 97 which will in turn provide configuration parameters to the CPE 16.

When a CPE 16 sends a provisioning inquiry 75 (FIGS. 2 and 8) to the provisioning entry point 52 of FIG. 10, the provisioning entry point will provided to the CPE 16 the identification of the provisioning servers 97. The identification of the provisioning server 97 may be IP addresses or domain names of various provisioning servers 99 such as an SNMP management server 20, a SYSLOG server 74, an authentication server 92, and other telephony service provider servers 93.

The CPE 16 may then continue its provisioning process by contacting such provisioning servers 99 as applicable. For example, an SNMP management server 20 may comprises a provisioning database 91. The provisioning database 91 may comprises a main table with a plurality of records, each of which is keyed to the CPE ID number 88. Associated with the CPE ID number 88 in the provisioning database 95 are configuration parameters 86 applicable to the device 16 bearing the CPE ID number 88. The configuration parameters 86 comprise class configuration parameters 68 and device configuration parameters 66.

When a CPE 16 contacts the SNMP management server 20, the SNMP management server may obtain device specific capabilities from the CPE 16, combine those device specific abilities with applicable device configuration parameters 66 and class configuration parameters 68 to build an initialization file comprising all of the necessary class configuration and device configuration parameters needed by the CPE 16 for operation in conjunction with the internet telephony service provider's systems. The initialization file is then provided to the CPE 16 utilizing the SNMP systems.

In summary, it should be appreciated that the systems and methods provided enable provisioning of a CPE without reliance on broad cast based protocols and specifically, even if the CPE can not contact a DCHP server controlled by its internet telephony service provider. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of identifying an internet telephony provisioning entity to an internet telephony device, the method comprising:
   storing a pre-provisioning contact and a unique device ID number in a non-volatile memory of the internet telephony device,
   receiving a provisioning contact of a provisioning entity assigned to the device at a pre-provisioning server and storing the provisioning contact in association with a unique device ID number assigned to the device;
   receiving an inquiry initiated from the device to the pre-provisioning server at the pre-provisioning contact, the inquiry comprising the unique ID number assigned to the device;
   responding to the inquiry with a response that includes the provisioning contact that was stored in association with the unique device ID number of the device; and
   wherein the steps of receiving an inquiry and the step of responding to the inquiry are performed over a hyper text transport protocol link initiated by the device to the pre-provisioning server; and
   wherein the step of storing the provisioning contact in conjunction with the unique device ID number comprises:
      writing the unique device ID number to a key field of a record in a look-up table; and
      writing the provisioning contact to a binary object field of the record in the look-up table.

2. The method of claim 1 wherein:
   the provisioning contact is a provisioning contact selected from a group of provisioning contacts consisting of a domain name of a provisioning entry point server and a combination of an IP address and port number of a provisioning entry point server; and
   the entry point server is a server that provides the device with provisioning information selected from a group of provisioning information consisting of a telephony configuration parameters associated with the device ID number and identification of provisioning servers associated with the device ID number which in turn provide telephony configuration parameters.

3. The method of claim 2, wherein:
   the step of receiving a provisioning contact of a provisioning entity comprises, receiving:
      the unique device ID number of the device; and
      the provisioning contact of the provisioning entity
   encapsulated in an IP frame from the provisioning entity.

4. The method of claim 2, wherein:
   the step of receiving a provisioning contact of a provisioning entity comprises receiving:
      the unique device ID number of the device; and
      the provisioning contact of the provisioning entity
   encapsulated in an IP frame from a point of sale system that assigned the provisioning entity to the device.

5. A pre-provisioning server for identifying an internet telephony provisioning entity to an internet telephony device that has both a unique device ID number and a pre-provisioning contact stored in its non-volatile memory; the pre-provisioning server comprising:
   a management application for receiving a provisioning contact of a provisioning entity assigned to the device and storing the provisioning contact in association with a unique device ID number assigned to the device;
   a device application for:
      receiving an inquiry initiated from the device to the pre-provisioning server at the pre-provisioning contact, the inquiry comprising the unique ID number assigned to the device; and
      responding to the inquiry with a response that includes the provisioning contact that was stored in association with the unique device ID number of the device;
   a web server application for receiving the inquiry and responding to the inquiry over a hyper text transport protocol link initiated by the device to the pre-provisioning server; and
   a look-up table comprising a key field and a binary object field; and
   wherein the management application stores the provisioning contact in conjunction with the unique device ID number by:
      writing the unique device ID number to the key field of a record in the look-up table; and
      writing the provisioning contact to the binary object field of the record in the look-up table.

6. The pre-provisioning server of claim 5, wherein:
   the provisioning contact is a provisioning contact selected from a group of provisioning contacts consisting of a domain name of a provisioning entry point server and a combination of an IP address and port number of a provisioning entry point server; and
   the entry point server is a server that provides the device with provisioning information selected from a group of provisioning information consisting of a telephony configuration parameters associated with the device ID number and identification of provisioning servers associated with the device ID number which in turn provide telephony configuration parameters.

7. The pre-provisioning server of claim 6, wherein:
   the management application receives a provisioning contact of a provisioning entity by receiving:
      the unique device ID number of the device; and
      the provisioning contact of the provisioning entity
   encapsulated in an IP frame from the provisioning entity.

8. The method of claim 6, wherein:
   the management application receives a provisioning contact of a provisioning entity by receiving:
      the unique device ID number of the device; and
      the provisioning contact of the provisioning entity
   encapsulated in an IP frame from a point of sale system that assigned the provisioning entity to the device.

9. An internet telephony device comprising:
   a non-volatile memory for storing:
      a unique device ID number assigned to the device; and
      a pre-provisioning contact;
   an IP module for communicating with other IP devices over a frame switched network using a network configuration and comprising a network configuration module for obtaining the network configuration from a DHCP server;
   an internet telephony provisioning module for:
      sending an inquiry to the pre-provisioning server at the pre-provisioning contact stored in the non-volatile memory, the inquiry comprising the unique ID number stored in the non-volatile memory;
      receiving a response to the inquiry that includes a provisioning contact;
      sending a provisioning inquiry to a provisioning entity associated with the provisioning contact; and
      obtaining provisioning information in response to the provisioning inquiry, the provisioning information selected from a group of provisioning information consisting of a telephony configuration parameters associated with the device ID number and identification of provisioning servers associated with the device ID number which in turn provide telephony configuration parameters; and wherein the internet telephony provisioning module:

sends the inquiry to the pre-provisioning server at the pre-provisioning contact by initiating a hyper text transport protocol link to the pre-provisioning server; and receives the response to the inquiry on the hyper text transport protocol link.

10. The internet telephony device of claim 9, wherein the provisioning contact is a provisioning contact selected from a group of provisioning contacts consisting of a domain name of a provisioning entry point server and a combination of an IP address and port number of a provisioning entry point server.

11. The internet telephony device of claim 10, wherein the internet telephony provisioning module:

stores the provisioning contact in the non volatile memory in response to receiving the response that includes a provisioning contact; and sends the inquiry to the pre-provisioning server at the pre-provisioning contact if the provisioning contact in response to determining that the provisioning contact is not available in the non volatile memory.

12. The internet telephony device of claim 10, wherein the internet telephony provisioning module:

determines whether telephony provisioning resources are included in a DHCP response provided by the DHCP server; and sends a provisioning inquiry to a provisioning entity associated with the provisioning contact in response to determining that the DHCP response does not include telephony provisioning resources.

13. The internet telephony device of claim 12, wherein the internet telephony provisioning module:

stores the provisioning contact in the non volatile memory in response to receiving the response that includes a provisioning contact; and sends the inquiry to the pre-provisioning server at the pre-provisioning contact in response to determining that the provisioning contact is not available in the non volatile memory.

14. A method of discovering internet telephony provisioning information, the method comprising:

storing a unique device ID number assigned to a device and a pre-provisioning contact in a non volatile memory;

obtaining a network configuration from a DHCP server; and using the network configuration to:

send an inquiry to a pre-provisioning server at the pre-provisioning contact, the inquiry comprising the unique ID number;

receiving a response to the inquire that includes a provisioning contact;

sending a provisioning inquiry to a provisioning entity associated with the provisioning contact; and obtaining provisioning information in response to the provisioning inquiry, the provisioning information selected from a group of provisioning information consisting of a telephony configuration parameters associated with the device ID number and identification of provisioning servers associated with the device ID number which in turn provide telephony configuration parameters; and wherein the step of sending the inquiry to the pre-provisioning server at the pre-provisioning contact comprises initiating a hyper text transport protocol link to the pre-provisioning server and sending the inquiry on the hyper text transport protocol link; and the step of receiving the response to the inquiry comprising receiving the response on the hyper text transport protocol link.

15. The method of claim 14, wherein the provisioning contact is a provisioning contact selected from a group of provisioning contacts consisting of a domain name of a provisioning entry point server and a combination of an IP address and port number of a provisioning entry point server.

16. The method of claim 15:

further comprising storing the provisioning contact in the non volatile memory in response to receiving the response that includes a provisioning contact; and the step of sending the inquiry to the pre-provisioning server at the pre-provisioning contact is performed in response to determining that the provisioning contact is not available in the non volatile memory.

17. The method of claim 15:

further comprising determining whether telephony provisioning resources are included in a DHCP response provided by the DHCP server; and the step of sending a provisioning inquiry to a provisioning entity associated with the provisioning contact is performed in response to determining that the DHCP response does not include telephony provisioning resources.

18. The method of claim 17, further comprising storing the provisioning contact in the non volatile memory in response to receiving the response that includes a provisioning contact; and the step of sending the inquiry to the pre-provisioning server at the pre-provisioning contact is performed in response to determining that the provisioning contact is not available in the non volatile memory.

* * * * *